Patented July 31, 1923.

1,463,483

UNITED STATES PATENT OFFICE.

ARMAND NIHOUL, OF VILLENEUVE-LE-ROI, AND CAMILLE CLERC, OF PARIS, FRANCE.

PROCESS FOR THE MANUFACTURE OF ZINC WHITE.

No Drawing.   Application filed November 9, 1920. Serial No. 422,857.

*To all whom it may concern:*

Be it known that I, ARMAND NIHOUL, subject of the King of Belgium, residing at 6 Avenue Caroline Thereze, Villeneuve-le-Roi, Seine-et-Oise, France, engineer, and I, CAMILLE CLERC, citizen of the Republic of France, residing at 29 Rue d'Astorg, Paris, Seine, France, engineer, have invented certain new and useful Improvements in Processes for the Manufacture of Zinc White; and we do hereby declare the following to be a full, clear and exact description of the invention, such as will enable others skilled in the art to which it appertains to make and use the same.

The object of the present invention is the manufacture of zinc white (carbonate, oxide or sulfide).

The process consists in transforming first into chloride the zinc contained in the raw material employed (zinc ore, zinc fumes, cadmia, oxides or carbonates of impure zinc, etc.) and in general all the products containing zinc; this operation is carried out by the well-known methods and the solution of zinc chloride thus obtained is purified from all the impurities it may contain, this being effected also by the well-known processes.

Than the zinc chloride is transformed into carbonate. For this purpose the process makes use of the action of carbonic acid on zinc chloride in the presence of magnesia or magnesium carbonate, comformably to the two following formulae:

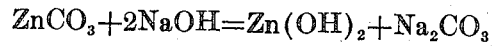
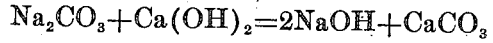

The solution of magnesium chloride is concentrated, then there is added magnesia thereto, in order to form a solid oxychloride of magnesium from which it is easy to recover the hydrochloric acid and the magnesia. This action may be represented by the formulae:

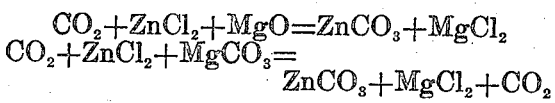

The zinc carbonate may be used as it is or can be employed in the manufacture either of zinc oxide or of zinc sulphide.

In general the zinc carbonate is transformed to oxide by calcination, but in this case the zinc oxide obtained has nearly always a more or less yellow colour; on the contrary we prefer to transform the carbonate into hydroxide through the action of a dilute solution of caustic soda or potash, for instance:

$$ZnCO_3 + 2NaOH = Zn(OH)_2 + Na_2CO_3$$

The solution of caustic soda is recovered through the action of lime:

$$Na_2CO_3 + Ca(OH)_2 = 2NaOH + CaCO_3$$

The zinc hydroxide obtained in this way is then dried and thus transformed into zinc oxide. It is of a fine white colour and can take the place of zinc oxide obtained in the dry way for most of its uses.

The precipitated zinc oxide or carbonate may be employed for the manufacture of zinc sulphide. To this end, for instance the carbonate may be dissolved in acetic acid or in a very dilute mineral acid.

The whole or part of the zinc is precipitated in the state of sulphide, then a fresh quantity of zinc carbonate is re-dissolved which is then precipitated in the state of sulphide, and so on.

It is moreover more convenient to place the carbonate of zinc in excess in suspension in a solution of hydrochloric acid, the whole is placed in a closed mixing device into which is sent hydrogen sulphide gas. A dilute solution of zinc chloride is first formed in presence of an excess of zinc carbonate in suspension; the following reaction is obtained when the hydrogen sulphide gas is passed through the solution:

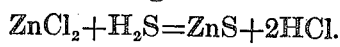

This acid redissolves a new proportion of zinc carbonate, and there is formed a new quantity of zinc chloride, then zinc sulfide, and so on until the whole of the zinc carbonate is transformed into zinc sulphide; at the end of the reaction there will only remain zinc sulphide, in a very dilute solution of hydrochloric acid, in such manner that the zinc sulphide is necessarily in a pure state and free from polysulphide and oxysulphide, inasmuch as these are decomposed by the hydrochloric acid.

It is also evident that instead of a dilute solution of acid or zinc salt to place the zinc carbonate in suspension, water may be employed, and this will gradually become acid by reason of the gas which is passed through.

The process thus permits, irrespectively of the zinc containing product used at the start, of obtaining in the first place a pure precipitated carbonate of zinc which is easily washed, then the magnesia and hydrochloric acid necessary are constantly recovered, and this carbonate may readily be transformed into zinc sulphide or oxide as above set forth.

This method of operating through the intermediary of zinc carbonate permits of obtaining the oxide and sulphide in a very pure state. In fact the precipitated carbonate is in a more granular form and can be better washed than the precipitates of oxide and sulphide. Moreover by precipitating the zinc twice, the first time in the state of carbonate and again by dissolving the latter and precipitating the zinc a second time in this second solution in the state of oxide and sulphide, these latter products are necessarily in a purer state than if they had been directly precipitated by any means from the original solution. This double precipitating action is also advantageous as concerns the recovery of the hydrochloric acid; in fact it is now possible to effect the precipitation of the carbonate in a concentrated solution which permits of recovering the hydrochloric acid in an easy manner, whereas the sulphide must be precipitated from a very dilute solution which would be quite expensive to concentrate in order to recover the hydrochloric acid.

This process may of course be carried out in various ways without departing from the principles thereof. For instance other acids may be substituted for the hydrochloric acid, such as sulphuric acid. The zinc carbonate is then obtained by reactions similar to those above described, but losing the advantage of an easy recovery of the acid and magnesia employed. The sulphate of magnesium obtained does not possess the same advantage as the chlorid in this respect.

We claim:—

1. In the process of manufacturing zinc white, precipitating zinc in the state of carbonate, forming a solution of said carbonate and further precipitating the zinc by double decomposition in the state of a binary compound of zinc with a bivalent metalloid.

2. In the process of manufacturing zinc white, precipitating the zinc in the state of carbonate, re-dissolving said carbonate in an acid solution, and further precipitating the zinc in the state of sulphide by means of hydrogen sulphide gas.

In testimony that we claim the foregoing as our invention, we have signed our names.

ARMAND NIHOUL.
CAMILLE CLERC.